Dec. 4, 1951 W. H. HUNT 2,577,686
METHOD OF FILLETING FISH
Filed Sept. 20, 1946 7 Sheets-Sheet 1

Fig.1.

INVENTOR.
WILLIAM H. HUNT
BY
ATTORNEY.

Patented Dec. 4, 1951

2,577,686

UNITED STATES PATENT OFFICE 2,577,686

METHOD OF FILLETING FISH

William H. Hunt, National City, Calif., assignor, by mesne assignments, to Fish Machinery Corporation, Boston, Mass., a corporation of Delaware Application September 20, 1946, Serial No. 698,097

5 Claims. (Cl. 17—45)

This invention relates to a new apparatus for and method of treating fish. More particularly, it relates to a new and improved apparatus for and method of filleting fish.

United States Patent No. 2,149,021 discloses an apparatus for and method of filleting fish wherein after a fish, tail leading and back downward, is slit throughout approximately its entire length upwardly through the back to the backbone and the belly slit by a pair of parallel incisions, the fillets remaining attached to the backbone by small ribbons of meat and to the ribs are removed from the skeleton by passage over a pair of ribbing knives.

According to United States Patent No. 2,149,021, the slit in the back is obtained by making a preliminary incision along the backbone and then inserting guide knives until they engage the backbone, whereupon continued movement of the fish causes the fish to be slit throughout its length with the slit extending to the backbone. After the back has been slit, the fish is caused to pass through the zone of action of a pair of rotating circular (belly) knives whereby the belly side of the fish is slit. During the belly-slitting operation, the backbone of the fish is supported on a pair of rotating guide discs which are designed to enter and extend into the slit in the back of the fish.

Both the belly-slitting knives and the guide discs rotate at high speeds, with the result that the fish is projected therefrom at a high speed onto a pair of ribbing knives arranged in adjacent parallel relationship to form a horizontal slit which fits the backbone of the fish. The forward portions of the ribbing knives form severing knife portions which sever the fish from the backbone and connect the back and belly incisions so that the fish is free of the backbone but connected to the ribs. Rearwardly of the severing knife portions, the ribbing knives diverge upwardly and form rib-scraping portions whereby the fillets are removed from the ribs. At the discharge extremity of the ribbing knives, a pair of rotating clipping knives sever any connection which may exist between the fillet and the fish skeleton.

A ribbing conveyer, disposed above the ribbing knives, is provided with fingers which extend through the belly incisions to engage the backbone on its top and thereby maintain the fish in proper position on the ribbing knives and also aid in feeding the fish thereover. If desired, the ribbing conveyer can be of the construction disclosed in United States Patent No. 2,397,158.

The above-described apparatus and method are admirably suited for filleting fish of large size, such as, for example, cod, haddock, etc. However, they are not suitable for the filleting of short fish, such as, for example, redfish. Due to the structure of the skeleton of redfish, when the latter are attempted to be filleted by the apparatus previously described, the incisions in the belly side of the fish will also sever the ribs, with the consequence that the fillets obtained will also contain the ribs (bones).

An object of this invention is to provide a new and improved method of and apparatus for filleting fish which is suitable for the filleting of short fish, such as redfish.

Another object of this invention is to provide a method and apparatus for filleting fish wherein the belly thereof is not incised.

An additional object of this invention is to provide a method and apparatus for filleting fish wherein the entire operation is performed from the back upwardly of the fish.

A further object of this invention is to provide a method and apparatus for filleting fish which does not require ribbing conveyers.

A still further object of this invention is to provide a method and apparatus for filleting fish wherein the fish is incised through the back adjacent both sides of the backbone up to and through the belly side at the tail portion and before the belly cavity, and thereafter, without incising the belly side, incising the ribbed portion of the fish upwardly from the back to the belly membrane and in close proximity to the ribs, and finally removing the fillets from the skeleton to which the uncut belly cavity and membrane are still attached.

A still further object of this invention is to provide a new and improved mechanism for incising the fish from the back thereof.

A still further object of this invention is to provide a pair of ribbing knives spaced to provide a slit in which the backbone of the fish passes and which is disposed in the path approximately assumed by the flight of the fish upon projection from the back-incising means.

A still further object of the invention is to provide means to hold and maintain the fish in center position as the fish passes over the ribbing knives.

A still further object of this invention is to provide a fillet guide which brings the ribs in close relationship to the ribbing knives, whereby maximum recovery is obtained.

A still further object of the invention is to provide fillet-retaining means to maintain the fillet in proper position on the ribbing knives.

Other and additional objects will appear hereinafter.

The objects of the invention are accomplished, in general, by feeding a fish, tail leading and back downward, through the zone of action of a pair of circular back-slitting knives which slit the fish upwardly from the back, and projecting the fish from the zone of action of the back-slitting knives onto a pair of ribbing knives disposed in a position to permit the fish to assume approximately the path of travel which the fish naturally tends to take upon leaving the zone of action of the back-slitting knives.

The thin portion of the fish between the tail and before the belly cavity is slit upwardly through the belly side, and thereafter the fish is slit upwardly to the belly cavity in close proximity to the ribs and without passing through the belly cavity or the belly side of the fish.

The back-slitting means consists of a pair of rotating circular knives. A pair of rotating hold-down discs cooperate with the back-incising knives to maintain the fish in position on the back-slitting knives. The hold-down discs are yieldingly mounted relative to the back-slitting knives whereby, as enlarged sections of the fish pass through the zone of action of the back-slitting knives, the hold-down discs will automatically be raised to accommodate the enlarged portions. Means are provided to adjust the pressure on a fish the hold-down discs and back-slitting knives. Means are also provided to limit the movement of the hold-down discs.

The ribbing knives comprise a pair of spaced knives having cutting edges at the top thereof. The ribbing knives are substantially vertically disposed and substantially parallel at the forward portion and thereafter they gradually diverge outwardly and upwardly from the forward extremity to the rear thereof. The ribbing knives are spaced from each other to provide a passage adjacent the bottom thereof in which the backbone of the fish passes. The ribbing knives are inclined downwardly so that they are disposed in position to permit the fish to assume approximately that path of travel which it tends to take upon leaving the zone of action of the belly-slitting knives. At the forward extremity, the ribbing knives are provided with means to sever any thin ribbon of skin at the tail end of the fish and which was not severed by the back-slitting means. At the discharge end, a pair of cut-off knives are provided.

Though, in general, it is not essential, in the preferred form of the invention a hold-down mechanism is provided to cooperate with the ribbing knives. The hold-down mechanism comprises a belly fin guide comprising a pair of movably mounted spaced plates between which the belly fin of the fish passes and whereby the fish is centered. The hold-down means is also provided with a pair of auxiliary members which bring the ribs in close relationship to the ribbing knives and constitute rib guides. The hold-down means also includes a pair of fillet-retaining means, one on each side of the machine, which serve to maintain the fish in proper position during the filleting operation. Each fillet guide is hingedly mounted whereby it may move in a curved path laterally of the ribbing knives and thereby accommodate itself to the increased thickness of the fillet.

The belly fin guide, the rib guides and the fillet-retaining means constituting the hold-down mechanism are mounted in the machine so as to permit simultaneous or independent movement thereof, depending on the section of the fish engaged thereby.

The present invention may be more clearly understood by reference to the following detailed description when taken in connection with the accompanying drawings, in which.

Figure 3:
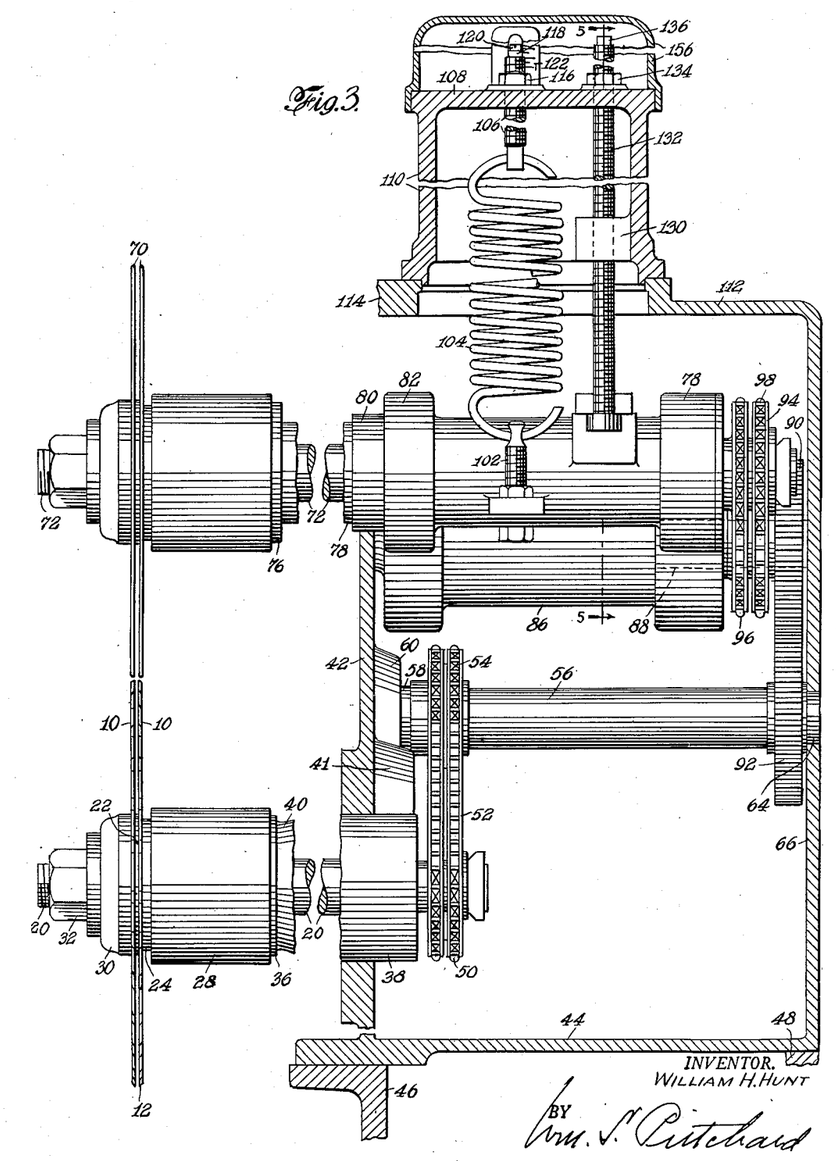
Figure 3 is an end view (partly in section) looking to the left in Figure 2.

Referring now to the drawings wherein like reference numerals designate like parts, the reference numeral 10 designates a pair of circular cutting knives which constitute the back-cutting knives. Each of the knives 10 is provided with a cutting edge 12 and a plurality of equally spaced peripheral notches 16. As is shown in Figure 3, cutting edge 12 is obtained by bevelling the outer face of each circular knife 10.

Figure 4:
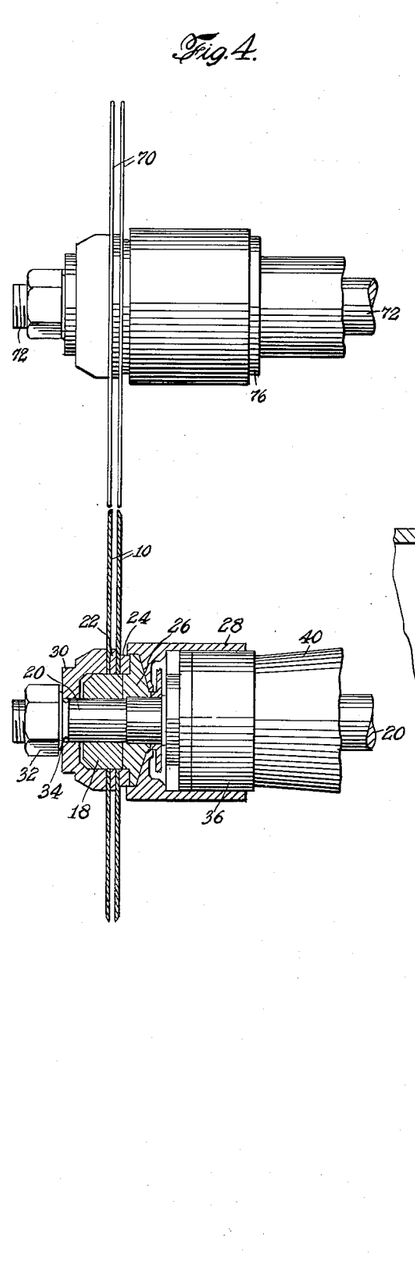
Figure 4 is a detail partly in section of the mounting of the circular knives and the hold-down discs.
Figure 5:
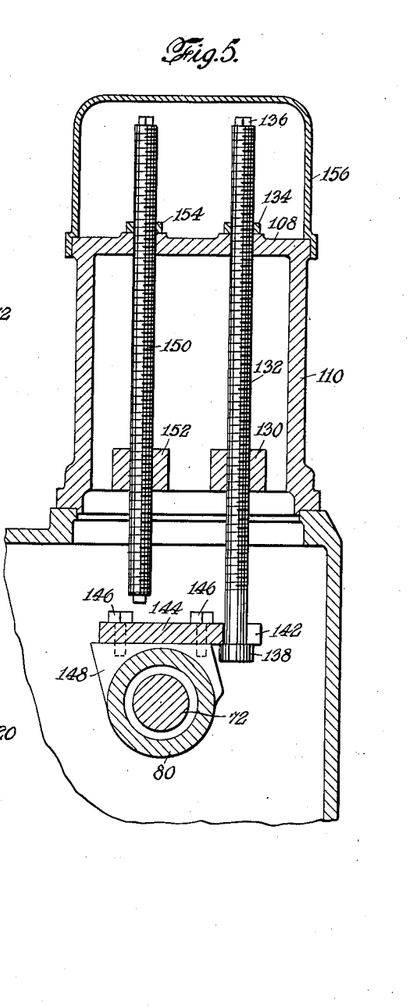
Figure 5 is a section taken on the line 5—5 of Figure 3.

The knives 10 are, as shown in Figure 4, disposed on a centering collar 18 secured on a knife shaft 20. A spacer 22 is disposed on the centering collar 18 and is of a thickness to space the knives 10 the necessary and desired amount. A spacing ring 24 positions the knives 10 relative to a member 26 of a water-seal. The member 26 is secured on shaft 20 and rotates therewith. A stationary water-seal member 28 cooperating with the member 26 is disposed on a bearing housing 36. A flanged ring 30 positions the knives 10 in contact with the spacer 22 and spacing ring 24. A nut 32 threadedly secured on the threaded end of the shaft 20 secures the spacing elements into position. A washer 34 is positioned intermediate the nut 32 and the flange spacer 30.

The shaft 20 is rotatably mounted in bearings carried in housings 36 and 38 of the usual type and construction. The housings 36 and 38 are connected by a sleeve 40. The housing 38 is provided with a bracket 41 which is appropriately secured to vertical frame members 42 which, in turn, are secured to horizontal frame members 44 carried on legs 46 and 48.

The shaft 20 is provided with a sprocket 50 which cooperates with a sprocket chain 52. The sprocket chain 52 also cooperates with a sprocket 54 which is secured on a shaft 56, one end of which is rotatably mounted in a bearing 58 supported by a bearing member 60 approproately secured to the frame member 42. The shaft 56 is also carried in a bearing 64 carried by the frame member 66 and is driven from a suitable source of power in any convenient manner. Upon driving the shaft 56, as will be hereafter explained, rotary motion is transmitted to the shaft 20 and hence to the back-cutting knives 10.

Above the back-cutting knives 10, a pair of hold-down discs 70 are rotatably mounted on a shaft 72. The hold-down discs 70 are in alignment with the back-cutting knives and are mounted on the shaft 72 in the identical manner in which the rotary knives 10 are mounted on shaft 20, as shown in Figure 4.

It is to be noted that the hold-down discs 70 engage the belly side of the fish but make no incision or slits therein.

The shaft 72 is rotatably mounted in bearings 76 and 78 carried by a housing 80. The housing 80 is provided with an arm 82 which terminates at its opposite end in a sleeve 86, rotatably mounted on a shaft 88 appropriately mounted in the machine. A gear 90 is secured to the shaft 88 and it cooperates with a gear 92 on the shaft 56. Thus, upon driving the shaft 56, the shaft 88 will be driven. By means of a sprocket chain 94 cooperating with sprocket 96 on shaft 88 and sprocket 98 on shaft 72, the rotary movement of the shaft 88 is transmitted to the hold-down discs 70. The size of the gears 90 and 92 and the sprockets 50, 54, 96 and 98 are such that the circular back-cutting knives 10 and hold-down discs 70 are driven at the same peripheral speed, though the gear ratio may be such that the peripheral speed of the cutting knives 10 is slightly greater than the peripheral speed of the hold-down discs 70.

The housing 80 is provided with a boss in which there is threadedly secured a stud 102. The stud 102 is provided with a hole in which is positioned one end of a tension spring 104. The other end of the spring 104 is secured in a hole in the lower end of a stud 106. The stud 106 extends through a hole in the top 108 of a support 110 carried by frame members 112 and 114. An adjustable stop 116 secures the stud 106 in adjusted position. A pointer 118 is secured to the top of the stud 106 by a screw 120. The free end of the pointer 118 cooperates with a scale 122 secured to the top 108 of the support 110 by means of a screw 124. The spring 104 yieldingly supports the arm 82 carrying the hold-down discs, as previously described. The scale 122 is graduated to indicate the tension of the spring 104, which is to provide the necessary pressure on a fish between the hold-down discs 70 and the back-cutting knives 10. In practice, the tension of the spring 104 is adjusted by raising or lowering the stud 106 upon proper manipulation of the stop 116 until the desired tension is obtained, as indicated by the pointer 118 on the scale 122.

Means are also provided to limit the upward and downward movement of the hold-down discs 70.

In the form shown, the support 110 is provided with a boss 130 in which there is threadedly positioned a stop rod 132. The stop rod 132 passes through the top 108 of the support 110 and is secured in position by a lock nut 134. The stop rod 132 is provided with a wrench end 136 at the top thereof and an enlarged head 138 at the bottom thereof. The stop rod 132 is slidably disposed in a slot of the bifurcated end 142 of a stop plate 144 secured by bolts 146 to a boss 148 on the housing 80 and, when the arm 82 is in its lowermost position, the bifurcated end will lie on the head 138. Upon the elevation of the arm 82 carrying the hold-down discs 70, the stop plate 144 will move upwardly relative to the stop rod 132 but upon lowering of the arm, when the bifurcated end 142 engages the head 138, further lowering of the arm, and hence the hold-down discs 70, is prevented.

The upward movement of the arm 82 is limited by a stop screw 150 which is positioned so as to engage the stop plate 144 when the arm 82 has been elevated to the height determined by the position of the stop screw 150. The stop screw 150, which is threaded in a boss 152 carried by the support 110, extends through the top 108 of the support 110. A lock nut 154 secures the stop screw in adjusted position. In practice, the stop screw 150 is adjusted to permit the elevation of the arm 82 in accordance with the fish to be filleted.

A cover 156 is removably secured to the support 110 to enclose the elements on the top 108.

Figures 11, 12, 13:
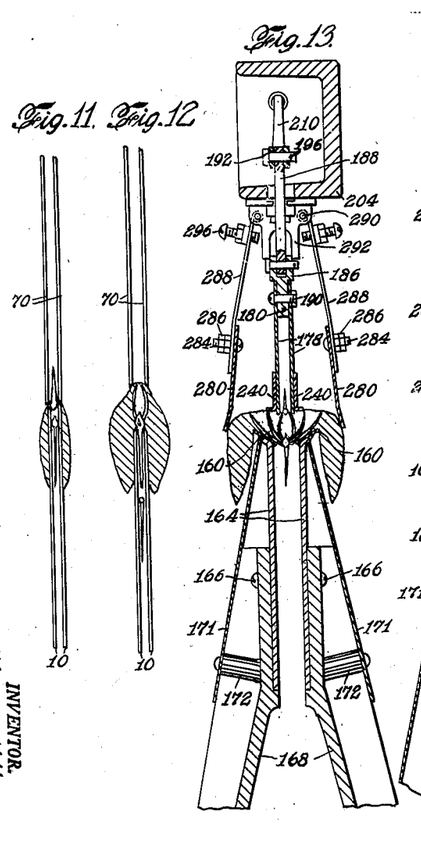
Figure 11 is a diagrammatic illustration of a fish shown in cross-section the tail end passing through the back-cutting knives and hold-down discs which are shown in elevation, as in Figs. 3 and 4, but on a reduced scale.
Figure 12 is a diagrammatic cross-section of the belly end of the fish passing through the back-cutting knives and hold-down discs.
Figures 13, 14, 15 and 16 are enlarged sections taken on the lines 13—13, 14—14, 15—15 and 16—16 respectively of Figure 1 and including a fish to show the operations at such various positions in the machine.

Figures 11 and 12 diagrammatically illustrate the passage of a fish through the zone of action of the cutting knives 10, Figure 11 illustrating that portion of the fish adjacent the tail end, while Figure 12 illustrates the belly portion of the fish passing through said zone of action.

Figure 1:
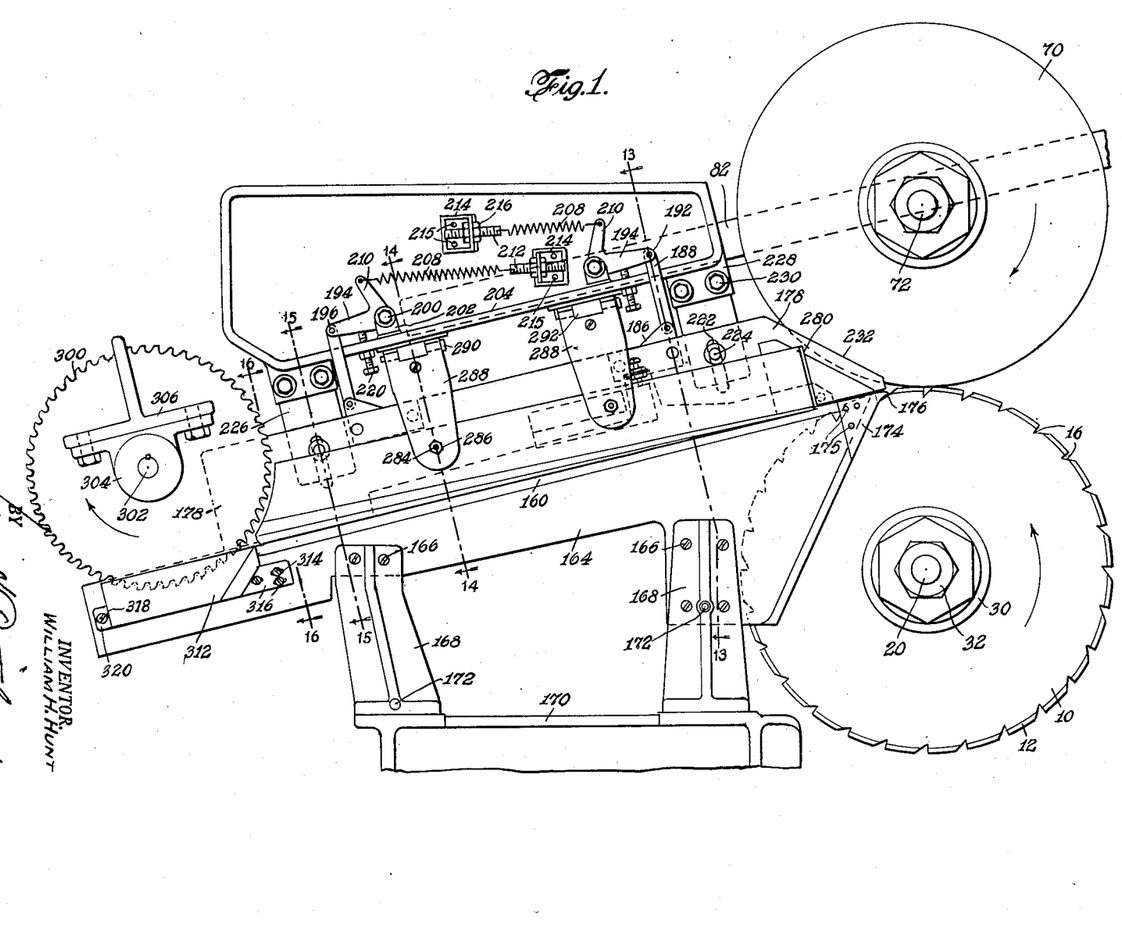
Figure 1 is a side elevation of a filleting machine embodying the invention, the ribbing knife shield being omitted.
Figure 2:
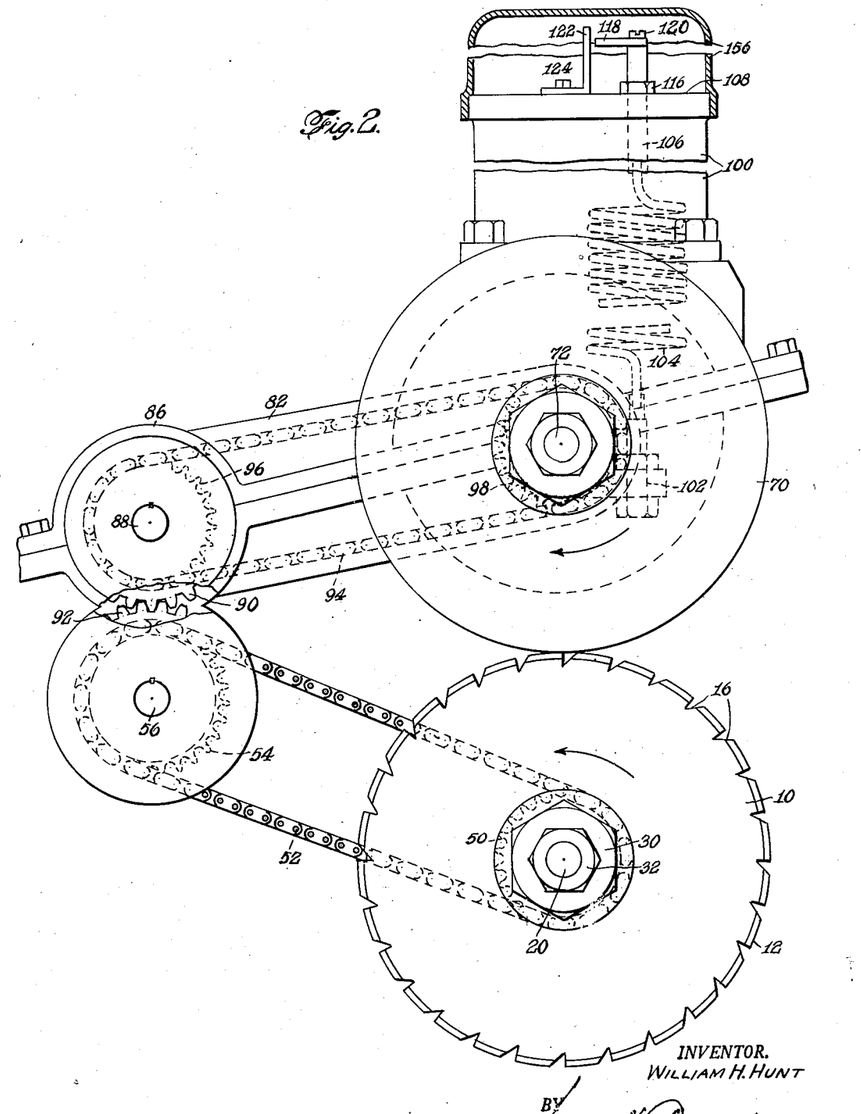
Figure 2 is a side elevation of the circular cutting knives and hold-down mechanism together with appurtenant details.
Figure 6:
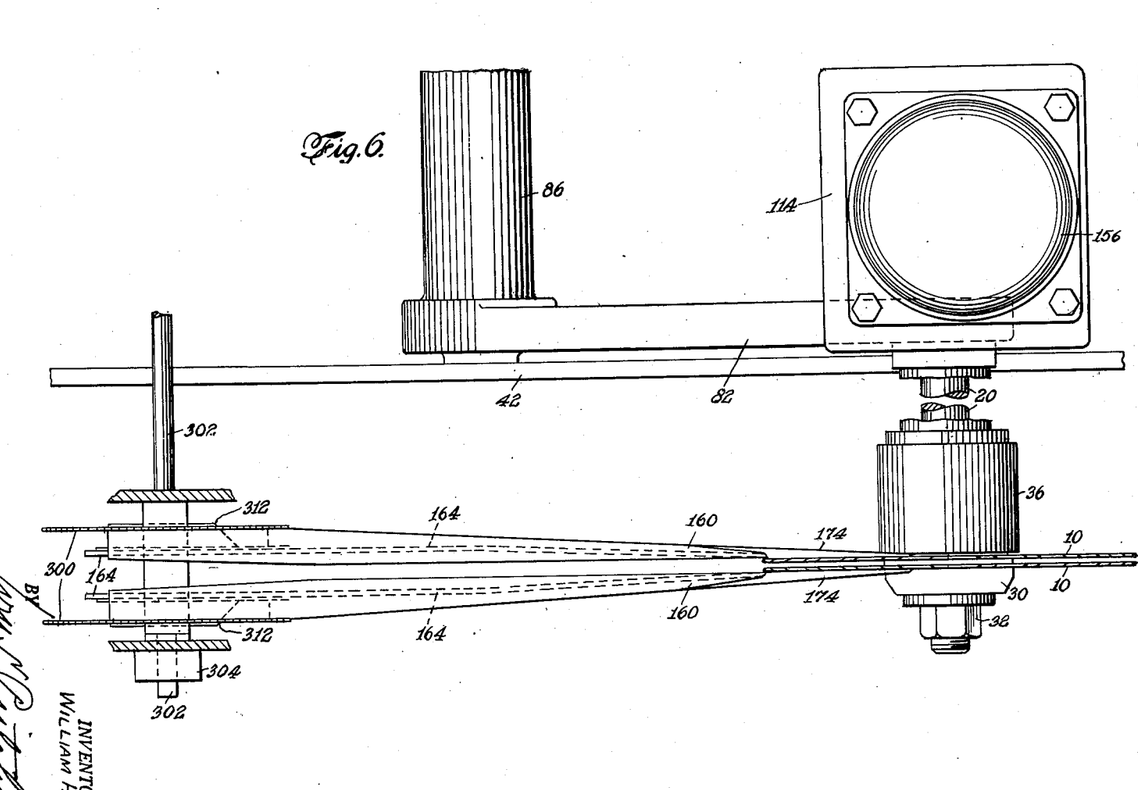
Figure 6 is a top plan view of the back-slitting knives, the ribbing knives and the cut-off knives.

Due to the rotation of the cutting knives 10 and hold-down discs 70, the fish is projected from the zone of action thereof and passes onto a pair of spaced cutting knives 160 which are in adjacent parallel relationship with each other to form a slit between which fits the backbone of the fish. As shown in Figures 1 and 6, the forward extremities of the ribbing knives 160 extend over or overlap onto the outer surfaces of the cutting knives 10. The knives, as shown in Figure 6, are parallel at their forward end and then diverge outwardly and upwardly, as shown in Figures 6 and 13 to 16 inclusive. The knives 160 are secured, as by soldering, to a pair of spaced knife holders 164 which, in turn, are secured by screws 166 onto brackets 168 carried on the frame member 170.

Upon projection of a fish from the zone of action of the rotating knives 10 and rotating hold-down discs 70, the fish tends to assume a certain path of travel. Accordingly, the brackets 168 are of such sizes that, when the knife holders 164 are secured thereto, the slot formed by the knives 160 and in which the backbone rides will be inclined downwardly and disposed in a position which approximates the path of travel which the fish tends to assume upon projection from the zone of action of the cutting knives 10. Preferably, a curved shield 171 extending from the knife holders is secured on the bosses 172 of the brackets 168.

The fish, due to the high speed at which it is projected from the zone of action of the cutting knives 10, will be caused to travel along the ribbing knives whereby the fillet is severed, the various stages of operation being shown in Figures 13 to 16 inclusive.

Sometimes the rotating back-cutting knives 10 do not completely sever the skin at the tail end of the fish, with the result that there remains an unsevered thin string of skin. If this thin string of skin is not severed, it will tend to prevent complete severance of the fillet from the skeleton. In order to sever this thin string, each knife blade 160 has a knife extension 174 secured thereto by means of rivets 175. The knife extension terminates in a sharp point 176 which overlaps onto the outer face of the cutting knives and is positioned so as to contact the thin thread of skin and sever the same.

In order to facilitate the filleting operation, there is provided a hold-down mechanism which includes a belly fin guide which also serves to center the fish. As shown in Figures 7 to 10 and 13 to 15 inclusive, the belly fin guide consists of a pair of plates 178 arranged in spaced relationship and yieldingly mounted in the machine, as will hereafter be more fully described, to permit the passage of the belly fin therebetween.

The plates 178 constituting the belly fin guide are secured to a pair of spacers 180 positioned adjacent the top of and intermediate the plates by means of bolts 182 and nuts 184.

Each of the spacers 180 is provided at the top thereof with a fork 186 which projects above the top edges of the plates 178. In each fork 186, one end of a link 188 is pivotally secured by means of a pin 190. The other end of the link 188 is secured in the bifurcated end 192 of the horizontal member 194 of a bell-crank lever by a pin 196.

The bell-crank lever is pivotally mounted on a stud 200 secured in a boss 202 carried by a support 204 appropriately mounted on the frame of the machine. As shown in Figure 1, one end of a spring 208 is secured to the free end of the other arm 210 of the bell-crank lever, and the other end of the spring 208 is secured to an adjusting screw 212 adjustably positioned in a bracket 214 appropriately secured on the support 204 by screws 215. Lock nuts 216 lock the screw 212 in adjusted position. The tension of the spring 208 is adjusted so as to suspend the belly fin guide at a level spaced from the slot formed by the knives 160. A stop screw 220 cooperates with the horizontal arm 194 of the bell-crank lever and serves to limit the downward movement of the plates 178.

As is shown in Figure 1 of the drawings, each spacer 180 is respectively connected to a link 188 which, in turn, is connected respectively to a bell-crank provided with spring tension means 208 and an adjustable stop screw 220. The links 188 are of such dimensions as to suspend the belly fin guide in a vertical plane with the bottom edge thereof parallel to but in spaced relationship to the slit, between the ribbing knives, in which the backbone passes. In other words, the belly fin guide is disposed so that the bottom thereof is in or parallel to the approximate path of travel which a fish tends to assume upon projection from the bottom cutting knives 10 and hold-down discs 70.

In practice, the belly fin guide is positioned so that it will center the fish on the ribbing knives and exert a slight pressure on the fish in addition to guiding the belly fin.

Due to the mode of suspending the belly fin guide, the latter is yieldingly mounted and will be raised and lowered depending on the size of the fish passing over the ribbing knives. Further, due to the mode of suspending the belly fin guide, the latter can be moved at the forward end independently of the rear end, and vice versa.

In order to guide the belly fin guide in its up and down movement, and also to provide pivots for the movement of the front or rear portions independently of the other, the plates 178 are provided with aligned elongated slots 222 in which a pin 224 is slidably disposed. The pin 224 is carried by a plate 226, which is secured at its upper end in a bifurcated lug 228 on the support 204 by screws 230.

As shown in Figure 1, the belly fin guide is provided with the guide and pivot means, described in the preceding paragraph, adjacent to each of the belly fin guide yielding suspension means.

The belly fin guide at its forward end overlaps on the outer faces of the hold-down disc 70. To facilitate the entrance of the belly fin, the belly fin guide is cut away at its forward end, as indicated by the reference numeral 232, so that it slopes downward and terminates in spaced relationship to the sharp pointed extremity 176 of the ribbing knives 160. The rear end of the belly fin guide extends beyond the rear end of the ribbing knives 160 and intermediate the cut-off knives, as will be hereinafter described.

The hold-down mechanism also includes rib guides, generally indicated by the reference numeral 240, which serve to bring the ribs of the fish into close relationship to the ribbing knives whereby maximum recovery can be obtained. As shown in Figures 9, 10, 13, 14 and 15, there are two rib guides 240 and the belly fin guide is positioned intermediate thereof. Each rib guide 240 is pivotally and yieldingly mounted on the plate 178 of the belly fin guide adjacent thereto. Since each rib guide and the means for pivotally and yieldably mounting the same are identical, only one of such rib guides and the means for mounting the same will be described.

Each rib guide 240 is provided at the bottom edge thereof with a flange 242, which, as shown in Figures 9, 10, 13, 14 and 15, flares outwardly in the direction from the front to the rear thereof. In general, the flaring of the flange 242 is in accordance with the divergence of the ribbing knives. The shape of the upper edge 244 of the rib guide is not critical. In the form shown, the upper edge 244 is irregular. Adjacent its forward end, the rib guide 240 is pivotally mounted on a stud 246 secured in the plate 178 adjacent thereto. The rib guide 240 is provided with an extension 248 projecting from the upper edge thereof. The extension 248 is bent at 90° to form a support 250 for a stop screw 252.

The rib guide 240 is disposed on the outer face of the plate 178 and the stop screw 252 cooperates with a stop member 256 carried on a plate 258 disposed on the outer surface of the plate 178 and overlapping onto the projection 248. A spacer plate 260 is positioned intermediate the plate 258 and the plate 178 of the belly fin guide so that the plate 258 will lie flat. Rivets 262 secure the plate 258, spacer 260 and belly fin guide plate 178 together.

The plate 258 is provided with an ear 266 in which one end of a spring 268 is positioned. The other end of the spring 268 is secured in a hole in the support 250 of the extension 248.

The spring 268 continuously urges the rib guide 240 to move about its pivot 246 in a counterclockwise direction, and the stop screw 252, which cooperates with the stop member 256, limits such counterclockwise movement.

Figure 9:
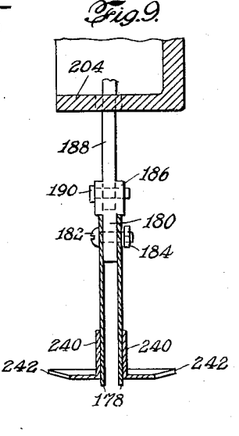
Figure 9 is a section taken on the line 9—9 of Figure 7.
Figure 10:
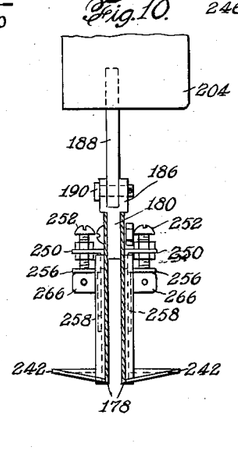
Figure 10 is a section taken on the line 10—10 of Figure 7.

At its forward end, the flange 242 of the rib guide is preferably positioned so that it lies near the transverse plane of the adjacent edge of the plate 178 as shown in Fig. 10 and slopes slightly upwardly in a rearward direction with respect to the bottom edge of the plate 178 on which it is secured as shown in Fig. 9. It is clear that since the rib guide is positioned on the belly fin guide, up and down movement of the fin guide will also result in up and down movement of the rib guide carried thereon. However, due to the yielding and pivotal mounting of the rib guide on the belly fin guide, each rib guide is also movable about its pivot independently of the belly fin guide on which it is secured and the other rib guide.

The shape of the end of the rib guide is not critical. In the form shown (see Figure 7), the forward end is cut away and is substantially parallel to the end 232 of the belly fin guide plates. A cover plate 270 positioned over the forward end and pivot of the rib guide is appropriately secured, as by soldering, to the adjacent plate 178. The cover plate 270 prevents any part of a fish from being caught in the space at the forward end between the rib guide and the belly fin guide.

Figure 7:
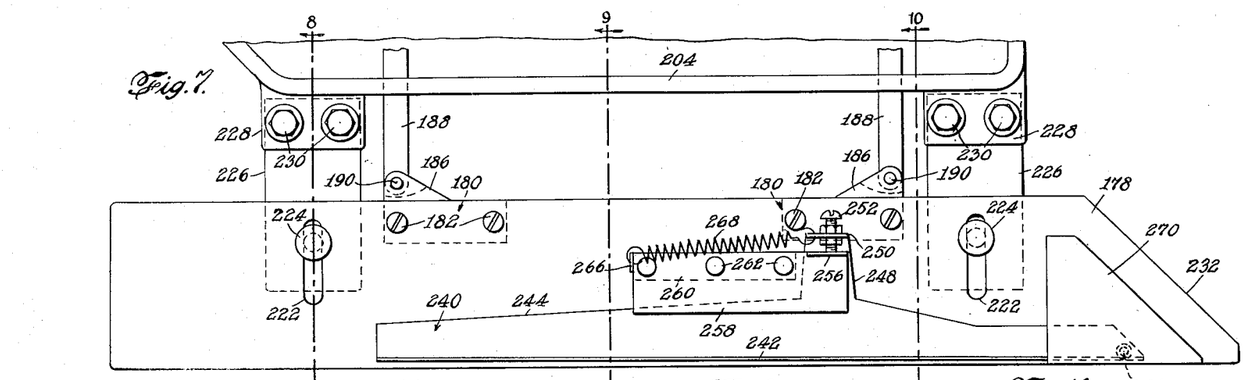
Figure 7 is an enlarged side elevation of the hold-down means, with the fillet-retaining means omitted.
Figure 8:
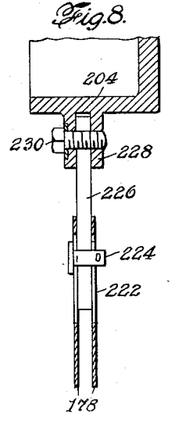
Figure 8 is a section taken on the line 8—8 of Figure 7.

Each rib guide 240 is shorter in length than the plate 178 on which it is mounted, as shown in Figures 1 and 7.

As previously mentioned, the flange 242 gradually flares outwardly in the direction from the front to the rear. At its rear, the flange 242 is of a width substantially equal to and preferably greater than the spread of the ribs of the largest fish to be filleted by the machine and at which point such fillet is substantially cut from the ribs but held by the skin on the belly side of the fish. In the case of a small fish, the largest spread of the ribs will be at a point before the rear end of the flange 242, and the flange 242 will cooperate with the fillet-retaining means 280, hereafter described, to maintain the fish in position for the severing of the skin.

Figure 14:
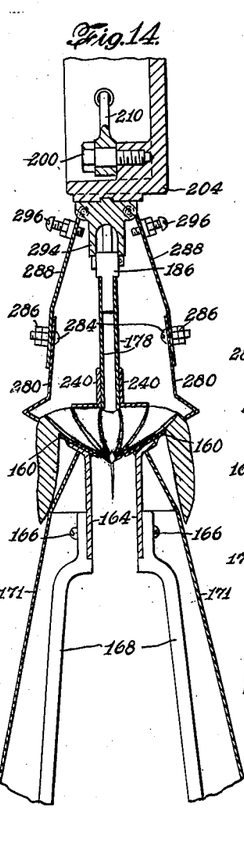
Figure 15:
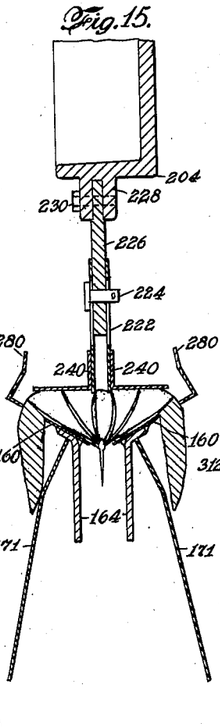

During operation, the rib guides exert a pressure on the belly side of the fish, with the result that the ribs are brought in close relationship with the ribbing knives and the fish tends to flatten. In order to retain the fish in position on the ribbing knives, there is provided a pair of fillet-retaining means. As shown in Figures 13, 14 and 15, there are two fillet-retaining means and, since both are identical and are mounted in the identical manner, only one of such fillet-retaining means and means for mounting the same will be described.

Each fillet-retaining means comprises a plate 280, the lower edge of which is provided with a bent hook end which progressively increases in size from the front to the rear of the machine, as shown in Figures 13, 14 and 15, so that the free end thereof will engage a fish substantially opposite to the ribbing knives and urge it thereon. Each fillet-retaining means 280 is appropriately secured, as by bolts 284 and nuts 286, to a pair of spaced hinged members 288, each of which is respectively hinged on a pivot 290 carried in a support 292 which, in turn, is secured to the support 204. The support 292 is provided with a yoke 294, which constitutes a stop member, and is adapted to cooperate with an adjustable stop screw 296 carried by the respective hinged members 288. By adjustment of the screws 296, the fillet-retaining means 280 is initially positioned as desired. The hinged members and the fillet-retaining means are made of a weight and so positioned that the fillet-retaining means will be, due to the action of gravity, urged inwardly and the fish maintained in position on the ribbing knives. As the fish increases in size during its passage on the ribbing knives, the hinged members will swing about their respective pivots in accordance with the size of the fish.

Each fillet-retaining means is mounted in the machine, as previously described, by two hinged elements. The fillet-retaining means are also mounted on an incline, as shown in Figure 1.

Each fillet-retaining means 280 is of a length that the forward end thereof is in the neighborhood of the forward end of the rib guide and the rear end terminates in close proximity to the cut-off knives 300. The rear end of the fillet-retaining guides are arcuated on a radius from the center of the cut-off knives.

The cut-off knives 300 are rotatably mounted on a shaft 302 carried in a bearing 304 appropriately mounted on a bearing support 306 appropriately mounted on the frame. The shaft on which the cut-off knives are mounted is driven by appropriate means (not shown). The cut-off knives 300, as shown in Figure 16, serve to completely sever the fillet from the skeleton to which the uncut belly membrane, designated by the reference numeral 310, is still attached.

Means (not shown) can be provided to receive the fillet after it has been completely severed by the cut-off knives.

Figure 16:
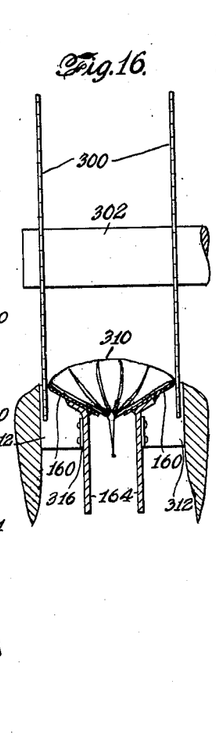

In order to aid the removal of the fillets, there is provided a stripper 312 which is positioned as shown in Figures 1, 6 and 16. The stripper is formed on a plate provided with a slot 314 in the ear 316 and a slot 318 in the ear 320. Bolts cooperating with the slots adjustably secure the stripper onto the knife holder 164.

In operation, a redfish, tail leading and back downward, is fed into and through the zone of action of the back-cutting knives 10 and the hold-down discs 70, the hold-down discs having been previously adjusted, through the adjustment of the spring 104 and the stop 132, so that the hold-down discs exert a pressure on the belly side of the fish without incising or cutting the same. As the fish is fed into the zone of action of the back-cutting knives 10 and hold-down discs 70, the tail feather enters the space between the cutting knives and hold-down discs respectively. Then the tail portion of the fish is forced downwardly by the hold-down discs whereby the tail portion of the fish, i. e. the thin portion between the tail feather and the belly cavity, is slit upwardly approximately through the top thereof and the backbone of such portion is between the back-slitting knives 10, as shown diagrammatically in Figure 11. In general, the tail portion of the fish which is slit, as shown in Figure 11, does not have any ribs. As the fish continues to pass through the zone of action of the cutting knives 10 and hold-down discs 70 and a larger cross-section of the fish passes through such zone of action, the increasing size of the fish body and backbone will elevate the hold-down discs 70 due to the manner in which they are mounted, as hereinbefore described, and the fish will be slit up to the belly cavity and in close proximity to the ribs, as diagrammatically shown in Figure 12. During passage of the fish, the belly fin will also pass between the hold-down discs.

The back-cutting knives 10 and hold-down discs 70 rotate at a high peripheral speed, with the result that they project the fish from the zone of action at a high velocity. As the fish is being projected, the ribbing knives, which are positioned in a path approximating that which the fish tends to assume upon projection from the zone of action of the cutting knives, enter in the slit formed in the back and the belly side of the fish passes beneath the hold-down mechanism. The sharp pointed extremity 176 of the ribbing knives 160 engage any string of skin at the tail portion which has not been severed and severs the same. The belly fin passes between the plates 178 of the belly fin guide whereby the fish is maintained in centered position and the belly of the fish passes beneath the rib guides while the fillet-retaining means retains the fish in position so that it can be filleted by the knives. Due to the mounting of the various members of the hold-down mechanism previously described, such members will move independently of each other to accommodate themselves to the size of the fish passing thereunder at any time. The fillets are finally severed from the skeleton, to which the uncut belly membrane and ribs may be still attached, by the cut-off knives.

The instant invention provides an apparatus and method for filleting fish wherein the fish is filleted entirely from the back upwardly and no incisions or other cuts are made in the belly membrane or belly side of the fish opposite thereto. The apparatus is more economical than the prior art filleting machines in that it performs fewer operations and thereby requires a simpler machine. For example, no ribbing conveyer nor belly-slitting knives are required.

Though the invention has been described in particular in connection with short fish, such as, for example, redfish or rose fish, the principles thereof can be utilized for the filleting of long fish by appropriate adjustment of the various mechanisms of the apparatus. The invention is equally applicable to fish which have been decapitated.

Since it is obvious that various changes and modifications can be made in the above description without departing from the nature or spirit thereof, this invention is not restricted thereto except as set forth in the appended claims.

I claim:

1. A method for filleting fish comprising feeding the fish tail first, incising the portion of the fish between the tail and the belly from the dorsal side past the backbone and substantially through the ventral side of the fish by a cut commencing adjacent the tail end and progressing towards the head end of the fish, continuing the cut towards the head end of the fish to incise the portion of the fish which is on the dorsal side of the ribs thereof from the dorsal side to a line short of the backbone joints of the ribs, and thereafter severing the fillet from the ribs.

2. A method for filleting fish as claimed in claim 1, wherein the fish is held on its ventral side during said incising operations.

3. A method for filleting fish as claimed in claim 1, wherein the severing of the fillet from the ribs is accomplished by cutting the fish from the internal extremity of the said cut which terminates at the line short of the backbone joints of the ribs, outwardly along the ribs towards the ventral side of the fish.

4. A method for filleting fish comprising feeding the fish tail first, incising the portion of the fish between the tail and the belly from the dorsal side thereof past the backbone on each side thereof and substantially through the ventral side thereof by cuts commencing adjacent the tail end and progressing towards the head end of the fish to incise the portion of the fish which is on the dorsal side of the ribs thereof from the dorsal side to lines in close proximity but short of the joints of the ribs on each side of the backbone, and thereafter severing the fillets from the ribs.

5. A method for filleting fish comprising feeding a fish tail first into a back-incising zone and while the fish is passing through said zone, incising the portion of the fish between the tail and belly from the dorsal side past the backbone and substantially through the ventral side of the fish, then incising the portion of the fish which is on the dorsal side of the ribs thereof from the back to a line in close proximity to but short of the backbone joints of the ribs, forcibly ejecting the fish from said back-incising zone and while it travels under the influence of said forcible ejection, severing the fillet from the ribs.

WILLIAM H. HUNT.

REFERENCES CITED

The following references are of record in the file of this patent:

UNITED STATES PATENTS

| Number | Name | Date |
| --- | --- | --- |
| 1,639,976 | Barry | Aug. 23, 1927 |
| 1,908,283 | Burnes | May 9, 1933 |
| 2,110,416 | David et al. | Mar. 8, 1938 |
| 2,149,021 | Hunt | Feb. 28, 1939 |
| 2,179,821 | Hunt | Nov. 14, 1939 |
| 2,210,234 | Durand | Aug. 6, 1940 |
| 2,311,176 | Hutton | Feb. 16, 1943 |
| 2,431,893 | Savrda | Dec. 2, 1947 |

FOREIGN PATENTS

| Number | Country | Date |
| --- | --- | --- |
| 632,024 | Germany | July 1, 1936 |